(12) United States Patent
Cardinale

(10) Patent No.: US 11,204,118 B2
(45) Date of Patent: Dec. 21, 2021

(54) PLUMBING FITTINGS

(71) Applicant: 9352-4585 QUÉBEC INC., Montréal (CA)

(72) Inventor: Claudio Cardinale, Montréal (CA)

(73) Assignee: 9352-4585 QUÉBEC INC., Montréal (CA)

( * ) Notice: Subject to any disclaimer, the term of this patent is extended or adjusted under 35 U.S.C. 154(b) by 382 days.

(21) Appl. No.: 16/321,842

(22) PCT Filed: Jul. 31, 2017

(86) PCT No.: PCT/CA2017/050919
§ 371 (c)(1),
(2) Date: Jan. 30, 2019

(87) PCT Pub. No.: WO2018/023196
PCT Pub. Date: Feb. 8, 2018

(65) Prior Publication Data
US 2019/0162344 A1 May 30, 2019

Related U.S. Application Data

(60) Provisional application No. 62/369,119, filed on Jul. 31, 2016, provisional application No. 62/376,942, (Continued)

(51) Int. Cl.
*F16L 37/091* (2006.01)
*F16L 27/12* (2006.01)

(52) U.S. Cl.
CPC ........... *F16L 37/0915* (2016.05); *F16L 27/12* (2013.01)

(58) Field of Classification Search
CPC .............................. F16L 37/091; F16L 37/0915
(Continued)

(56) References Cited

U.S. PATENT DOCUMENTS 5,160,179 A 11/1992 Takagi
5,487,572 A 1/1996 Combot-Courrau et al.
(Continued)

FOREIGN PATENT DOCUMENTS

CN 101329001 12/2008
CN 104154363 11/2014
(Continued)

OTHER PUBLICATIONS

English Translation—Machine Generated of CN104154363(A), "Pipe fitting quick connection device", published on Nov. 19, 2014.
(Continued)

*Primary Examiner* — Aaron M Dunwoody
(74) *Attorney, Agent, or Firm* — Bereskin & Parr LLP/S.E.N.C.R.L., s.r.l.

(57) ABSTRACT

Plumbing fittings and methods of manufacturing plumbing fittings for use in drain-waste-vent systems are described herein. The plumbing fittings include a housing having at least one receiving member defining a cylindrical bore for receiving a piping member therein, at least one annular seal fittingly inserted in a receiving member, and an annular locking member dimensioned for receiving the piping member therethrough. The annular locking member includes teeth extending inwardly for locking the piping member within the receiving member. The plumbing fittings also include an annular releasing member inserted within the receiving member and movable between a locking position and a releasing position whereat the beveled portion of the annular releasing member presses against the teeth for releasing the piping member.

16 Claims, 14 Drawing Sheets

Related U.S. Application Data filed on Aug. 19, 2016, provisional application No. 62/474,043, filed on Mar. 20, 2017, provisional application No. 62/482,721, filed on Apr. 7, 2017.

(58) Field of Classification Search
USPC .......................................................... 285/39
See application file for complete search history.

(56) References Cited

U.S. PATENT DOCUMENTS

| | | | |
|---|---|---|---|
| 6,481,634 | B1 | 11/2002 | Zosimadis |
| 7,530,606 | B1 | 5/2009 | Yang |
| 8,160,822 | B2 | 4/2012 | Song |
| 8,887,324 | B2 | 11/2014 | Klicpera |
| 9,068,680 | B1 | 6/2015 | Crompton et al. |
| 2004/0245766 | A1 | 12/2004 | Vallee |
| 2008/0309081 | A1 | 12/2008 | De Wilde |
| 2010/0072744 | A1 | 3/2010 | Xie |
| 2011/0089684 | A1 | 4/2011 | Schutte et al. |
| 2012/0111799 | A1 | 5/2012 | Lemoine et al. |
| 2012/0169039 | A1* | 7/2012 | Crompton ............. F16L 37/091 285/18 |
| 2013/0181446 | A1 | 7/2013 | Le Clinche |
| 2013/0200609 | A1 | 8/2013 | Dole et al. |
| 2015/0021911 | A1 | 1/2015 | Bowman et al. |
| 2015/0240980 | A1 | 8/2015 | Bobo et al. |
| 2015/0345683 | A1* | 12/2015 | Crompton ............. F16L 37/091 285/340 |
| 2016/0161038 | A1* | 6/2016 | Crompton ........... F16L 37/0915 285/340 |

FOREIGN PATENT DOCUMENTS

| | | |
|---|---|---|
| CN | 105318127 | 2/2016 |
| EP | 2472161 | 7/2012 |
| GB | 2466681 | 7/2010 |
| JP | H10299957 | 11/1998 |
| JP | 2001032984 | 2/2001 |
| JP | 2013234760 | 11/2013 |

OTHER PUBLICATIONS

English Translation—Machine Generated of CN105318127(A), "Rapid connection mechanism for pipes", published on Feb. 10, 2016.

English Translation—Machine Generated of CN101329001A, "Internal tooth snap ring of fluid pipe connection apparatus", published on Dec. 24, 2008.

English Translation—Machine Generated of JP2001032984A, "Pipe Joint", published on Feb. 6, 2001.

English Translation—Machine Generated of JP2013234760A, "Pipe Joint", publihsed on Nov. 21, 2012.

English Translation—Machine Generated of JPH10299957A, "Connection Plug Device of Tube Member and its Elastic Lock Ring Metal Fitting for Locking", published on Nov. 13, 1998.

* cited by examiner

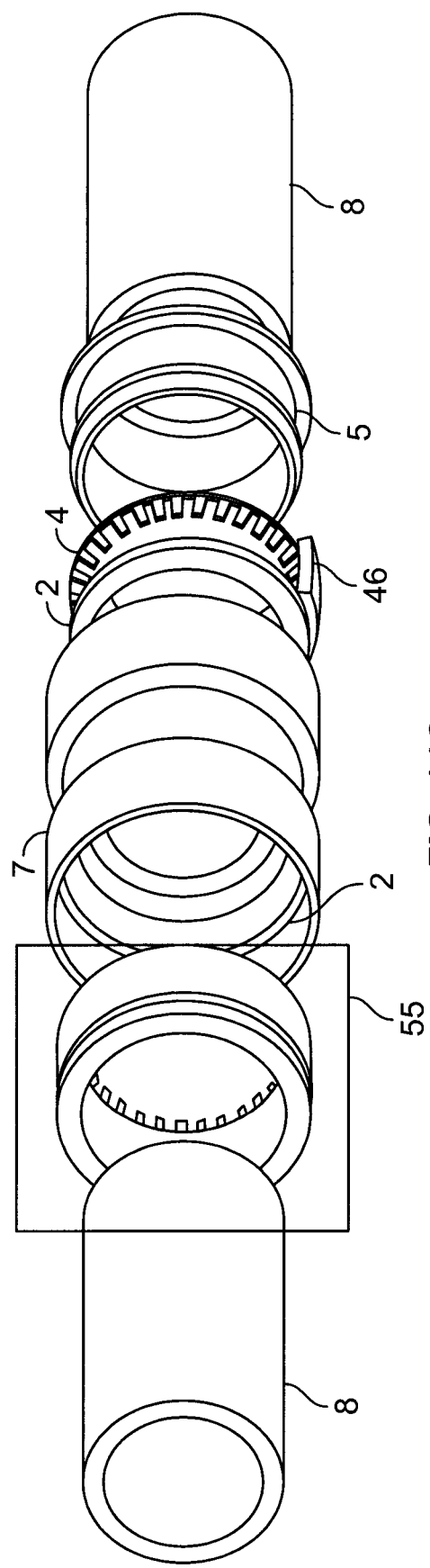

PLUMBING FITTINGS

CROSS-REFERENCE TO RELATED APPLICATION

The present application is a 35 USC 371 national stage entry of PCT/CA2017/050,919 filed on Jul. 31, 2017 and which claims priority to U.S. provisional application No. 62/369,119 filed on Jul. 31, 2016; U.S. provisional application No. 62/376,942 filed on Aug. 19, 2016; U.S. provisional application No. 62/474,043 filed on Mar. 20, 2017; and U.S. provisional application No. 62/482,721 filed on Apr. 7, 2017. These documents are hereby incorporated by reference in their entirety.

FIELD OF THE DISCLOSURE

The present disclosure relates to plumbing fittings for use in drain, waste and vent (DWV) systems, and more particularly to plumbing fittings for connecting pipes together without the use of glue or any other type of fusion that may exist on any type of piping.

BACKGROUND OF THE DISCLOSURE

Installation of a plumbing fitting for DWV systems typically requires a form of glue between the pipe and the fitting. Inadequate sealing of the fitting to the pipe can lead to various types of leaks that can cause an undesirable mess and potential damage.

Typically, a fitting that is glued or fused to any type of plastic pipe for use in a DWV system must be cut off from the pipe in the event that it is not correctly connected and furthermore if there is some water flowing through the pipe the glue or fusing, the DWV system will not work properly, leading to a potential risk of water leakage and odor. Moreover, installation of the fittings presents a high level of difficulty for some users.

Various types of plumbing fittings not requiring gluing or other fusing have been developed. However, a remaining drawback is that special tools for separating the piping from the fitting, for example disconnecting clips or tongs, are required. These tools can be difficult to use in awkward or small spaces.

SUMMARY

It would thus be highly desirable to be provided with an apparatus or method that would at least partially address the disadvantages of the existing technologies.

In one aspect, there is provided a plumbing fitting, comprising:
- a housing having at least one receiving member, the at least one receiving member defining a cylindrical bore for receiving a piping member therein;
- at least one annular seal fittingly inserted in the receiving member, the at least one annular seal being dimensioned to sealingly engage with the piping member;
- an annular locking member comprising an annular base and teeth extending inwardly for locking the piping member within the receiving member, the annular base being inserted within the receiving member, the annular locking member dimensioned for receiving the piping member therethrough; and
- an annular releasing member inserted within the receiving member and comprising a beveled portion, the annular releasing member being dimensioned to receive the piping member therethrough, and the annular releasing member being movable within the receiving element between a locking position for locking the pipe into the receiving member, and a releasing position whereat the beveled portion presses against the teeth of the annular locking member for releasing the piping member.

In another aspect, there is provided a plumbing fitting, comprising:
- a housing having at least one receiving member, the at least one receiving member defining a cylindrical bore for receiving a piping member therein;
- at least one annular seal fittingly inserted in the receiving member, the at least one annular seal being dimensioned to sealingly engage with the piping member;
- an annular locking member comprising an annular base and teeth extending inwardly for locking the piping member within the receiving member, the annular base being inserted within the receiving member, the annular locking member dimensioned for receiving the piping member therethrough; and
- an annular releasing member inserted within the receiving member and comprising a beveled portion, the annular releasing member being dimensioned to receive the piping member therethrough, and the annular releasing member being movable within the receiving element between a locking position for locking the pipe into the receiving member whereat the beveled portion abuts against a shoulder formed in an inner surface, and a releasing position whereat the beveled portion presses against the teeth of the annular locking member for releasing the piping member.

In another aspect, there is provided a plumbing fitting, comprising:
- a housing having at least one receiving member, the at least one receiving member defining a cylindrical bore for receiving a piping member therein;
- at least one annular seal fittingly inserted in an annular groove formed in the receiving member, the at least one annular seal dimensioned to sealingly engage with the piping member;
- an annular locking member comprising an annular base and teeth extending inwardly for locking the piping member within the receiving member, the annular base being dimensioned for contacting a receiving element inserted in the receiving member, the annular locking member dimensioned for receiving the piping member therethrough; and
- an annular releasing member inserted within the receiving element and the receiving member and comprising a beveled portion, the annular releasing member being dimensioned to receive the piping member therethrough, and the annular releasing member being movable within the receiving element between a locking position for locking the pipe into the receiving member whereat the beveled portion abuts against a shoulder formed in an inner surface of the receiving element, and a releasing position whereat the beveled portion presses against the teeth of the annular locking member for releasing the piping member.

In another aspect, there is provided a plumbing fitting, comprising:
- a housing having at least one receiving member, the at least one receiving member defining a cylindrical bore for receiving a piping member therein;

at least one annular seal fittingly inserted in an annular groove formed in the receiving member, the at least one annular seal dimensioned to sealingly engage with the piping member;

an annular locking member comprising an annular base and teeth extending inwardly for locking the piping member within the receiving member, the annular base being inserted within a receiving element that is inserted in a first chamber formed in the receiving member, the annular locking member dimensioned for receiving the piping member therethrough; and an annular releasing member inserted within the receiving element and the receiving member and comprising a beveled portion, the annular releasing member being dimensioned to receive the piping member therethrough, and the annular releasing member being movable within the receiving element between a locking position for locking the pipe into the receiving member whereat the beveled portion abuts against a shoulder formed in an inner surface of the receiving element, and a releasing position whereat the beveled portion presses against the teeth of the annular locking member for releasing the piping member.

In another aspect, there is provided a plumbing fitting, comprising:

a housing having at least one receiving member, the at least one receiving member defining a cylindrical bore for receiving a piping member therein;
at least one annular seal fittingly inserted in an annular groove formed in the receiving member, the at least one annular seal dimensioned to sealingly engage with the piping member;

an annular locking member comprising an annular base and teeth extending inwardly for locking the piping member within the receiving member, the annular base being inserted within a first chamber formed in the receiving member, the annular locking member dimensioned for receiving the piping member therethrough; and an annular releasing member inserted within the receiving member and comprising a beveled portion, the annular releasing member being dimensioned to receive the piping member therethrough, and the annular releasing member being movable within the receiving member between a locking position whereat the beveled portion abuts against a shoulder formed in an inner surface of the receiving member, and a releasing position whereat the beveled portion presses against the teeth for releasing the piping member.

In another aspect, there is provided a plumbing fitting, comprising:

a housing having at least one receiving member, the at least one receiving member defining a cylindrical bore for receiving a piping member therein;
at least one annular seal fittingly inserted in an annular groove formed in the receiving member, the at least one annular seal dimensioned to sealingly engage with the piping member;

an annular locking member comprising an annular base and teeth extending inwardly for locking the piping member within the receiving member, the annular base being inserted within a first chamber formed in the receiving member, the annular locking member dimensioned for receiving the piping member therethrough; and an annular releasing member inserted within the receiving member and comprising a beveled portion, the annular releasing member being dimensioned to receive the piping member therethrough, and the annular releasing member being movable within the receiving member between a locking position whereat the beveled portion abuts against a shoulder formed in an inner surface of the receiving member, and a releasing position whereat the beveled portion presses against the teeth for releasing the piping member, wherein the annular releasing member is actuatable in the absence of a tool.

In a further there is provided herein a method of manufacturing a plumbing fitting, comprising:

obtaining a first half of a receiving member;
inserting into the first half of the receiving member at least one annular seal member, an annular locking member and an annular releasing member; and
combining together the first half portion of the receiving member with a second half portion of a the receiving member so as to sandwich the at least one annular seal member, the annular locking member and the annular releasing member therebetween.

In another aspect, there is provided a method of manufacturing a plumbing fitting, comprising:

obtaining a first portion of a receiving member;
inserting into the first portion of the receiving member at least one annular seal member, an annular locking member and an annular releasing member; and
combining together the first portion of the receiving member with a second portion of a the receiving member and a third portion of a the receiving member so as to sandwich the at least one annular seal member, the annular locking member and the annular releasing member therebetween.

In another aspect, there is provided a kit, comprising:
at least one plumbing fitting;
at least one annular seal;
at least one annular locking member for locking a piping member into the plumbing fitting; and
at least one annular releasing member for urging outwardly teeth of the locking member and releasing the piping member.

In another aspect, there is provided a kit, comprising:
at least one plumbing fitting as defined in the present disclosure;
at least one annular seal as defined in the present disclosure;
at least one annular locking member as defined in the present disclosure; and
at least one annular releasing member as defined in the present disclosure.

In another aspect, there is provided a method for connecting a plumbing fitting and a piping member, the method comprising:

inserting the piping into an annular locking member comprised within the fitting; and
releasing teeth of the locking member so that the teeth move into a locking position for locking the pipe into the fitting.

In another aspect, there is provided method for connecting a plumbing fitting and a piping member, the method comprising:

inserting the piping into the annular locking member and the fitting and pushing outwardly teeth of an annular locking member disposed within the plumbing fitting so as to put them in a release position; and
releasing pressure applied against the teeth so that the teeth move back into a locking position for locking the pipe into the fitting.

In another aspect, there is provided a method for sealingly engaging a plumbing fitting and a piping member, the method comprising:

inserting the piping into an annular locking member comprised within the fitting and contacting the piping member with at least one seal disposed within the fitting; and releasing pressure applied against teeth of the locking member so that the teeth move back into a locking position for locking the pipe into the fitting.

In another aspect, there is provided a method for sealingly engaging a plumbing fitting and a piping member, the method comprising:

inserting the piping into the annular locking member and the fitting by pushing outwardly teeth of an annular locking member disposed within the plumbing fitting so as to put them in a release position;

contacting the piping member with at least one seal disposed within the fitting; and releasing pressure applied against the teeth so that the teeth move back into a locking position for locking the pipe into the fitting.

The plumbing fittings, kits and methods herein disclosed provide ease of installation and removal. A piping element can be simply pushed into the plumbing fitting, thus providing a secure seal with no need for toxic and odorous adhesives or other fusing means. The fitting can be removed if needed without requiring cutting the plumbing fitting or piping element. Moreover, the plumbing fitting can be removed without required recourse to disconnecting tools. For example, the piping or tube can be removed by simply pushing by hand on the annular releasing member (e.g. the release collar).

DRAWINGS

The following drawings represent non-limitative examples in which:

FIG. 14C is another exploded view of the plumbing fitting of FIG. 14A;

DESCRIPTION OF VARIOUS EMBODIMENTS

Figure 1:
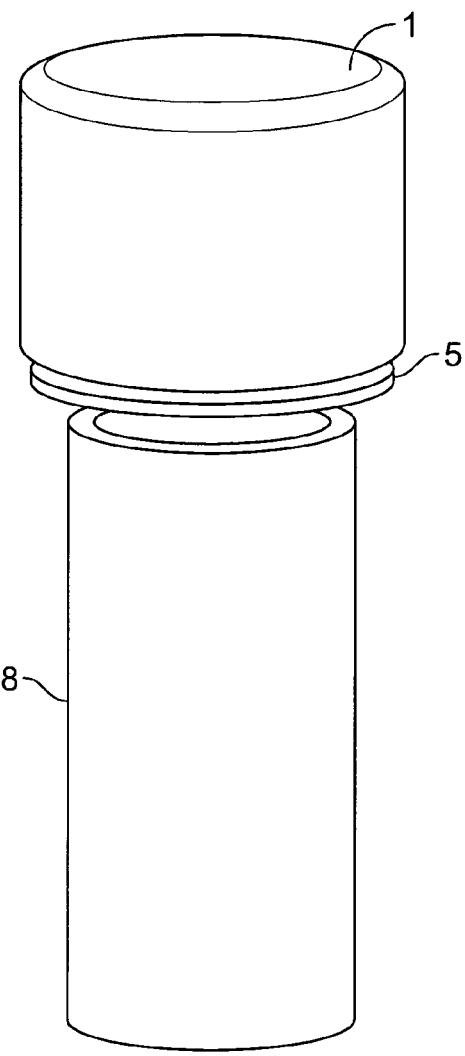
FIG. 1 illustrates a frontal view of an end cap enclosing a receiving member, according to one exemplary embodiment.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean "at least a second or more" unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

For example, the annular releasing member is hand actuatable.

For example, the at least one receiving member is disposed at an extremity of the housing.

For example, the at least one annular seal and the annular groove are integrally formed.

For example, the inner diameter of the at least one annular seal is inferior to the inner diameter of the housing.

For example, wherein the at least one annular seal is an o-ring.

For example, the plumbing fitting comprises two annular seals.

For example, the two annular seals are o-rings.

For example, the two annular seals are non-contiguous to one another.

For example, the teeth are dimensioned for preventing rotational movement and longitudinal movement of the piping member within the receiving member.

For example, the annular base of the annular locking member comprises at least one locking tab extending outwardly therefrom for reducing rotational and longitudinal movement of the annular locking member within the receiving member, the at least one locking tab is inserted in a locking groove formed in the receiving member.

For example, the annular base of the annular locking member comprises two locking tabs inserted in two locking grooves formed in the receiving member.

For example, the annular locking member is made of a non-corrosive metal or plastic.

For example, the non-corrosive metal is stainless steel.

For example, the teeth comprise jagged edges.

For example, the beveled portion rests in a second chamber formed in the receiving member.

For example, a ledge projecting from the second chamber forms the shoulder against which the beveled portion abuts.

For example, when the annular releasing member is in the releasing position, the beveled portion presses against the teeth which are displaced towards the surface of the receiving member thereby releasing the teeth from the piping element.

For example, the annular releasing member further comprises a flanged end opposing the beveled portion.

For example, the flanged end extends radially outwardly from the annular releasing member.

For example, the flanged end abuts against the receiving member so as to limit movement of the annular releasing member within the housing.

For example, the pressing of the flanged end presses the beveled portion against the teeth thereby releasing the teeth from the piping member.

For example, the releasing of the piping element from the teeth does not require recourse to a tool.

For example, the annular releasing member is actuatable in the absence of a tool.

For example, the housing comprises two receiving members that are in fluid flow communication with one another.

For example, the two receiving members comprise a tubing body therebetween.

For example, the housing comprises three receiving members.

For example, the plumbing fitting is an end cap, a coupling fitting, a Y fitting, a T fitting, a TY fitting, a 45 elbow fitting and a 90 elbow fitting.

For example, the at least one receiving member is comprised of a first receiving member portion and a second receiving member portion combined together.

For example, the first receiving member and second receiving member are integrally formed.

For example, the first receiving member and second receiving member comprise female edges and male edges for coupling therewith.

In a further there is provided herein a method of manufacturing a plumbing fitting, comprising:
  obtaining a first half of a receiving member;
  inserting into the first half of the receiving member at least one annular seal member, an annular locking member and an annular releasing member; and
  combining together the first half portion of the receiving member with a second half portion of a the receiving member so as to sandwich the at least one annular seal member, the annular locking member and the annular releasing member therebetween.

For example, the receiving member portions are combined together, an annular groove for receiving the at least one annular seal is formed.

For example, the receiving member portions are combined together, a first chamber for receiving an annular base of the annular locking member is formed.

For example, the receiving member portions are combined together, a second chamber for receiving a beveled portion of the annular releasing member is formed.

For example, the plumbing fitting can further comprising a spacer for urging and/or maintaining teeth of the locking member inwardly.

For example, the plumbing fitting can further comprising a spacer for preventing teeth of the locking from moving outwardly beyond a desired position.

In another aspect, there is provided a method of manufacturing a plumbing fitting, comprising:
  obtaining a first portion of a receiving member;
  inserting into the first portion of the receiving member at least one annular seal member, an annular locking member and an annular releasing member; and
  combining together the first portion of the receiving member with a second portion of a the receiving member and a third portion of a the receiving member so as to sandwich the at least one annular seal member, the annular locking member and the annular releasing member therebetween.

For example, the plumbing fitting herein disclosed may be manufactured according to a method herein disclosed.

For example, the receiving element maintains the annular locking member and the at least one annular seal inside the receiving member.

For example, the receiving element can be glued into the receiving member.

For example, the receiving element can be snap fitted into the receiving member.

For example, the receiving element can comprise at least one nipple effective for locking into a matching groove defined into the receiving member.

For example, the fitting can further comprise a spacer disposed between the annular locking member and the annular seal, the spacer being urging the teeth of the locking member inwardly.

For example, the fitting can further comprise at least one another annular seal, the seal being connected at a receiving end of the receiving member whereat the piping member is to be received.

For example, inserting the piping member into the plumbing fitting by applying a pressure on the piping member by pushing the piping member into the plumbing fitting can cause the teeth to move outwardly into the release position and wherein releasing the piping member causes the teeth to move back into the locking position.

For example, inserting the piping member into the plumbing fitting by pushing the piping member into the plumbing fitting can cause the teeth to move outwardly into the release position and wherein releasing the piping member causes the teeth to move back into the locking position.

For example, the method can further comprise disconnecting the plumbing fitting and the piping member from one another by applying a pressure on a releasing member disposed within the plumbing fitting, wherein applying pressure on the releasing member urges the teeth outwardly in the release position so as to free the piping member; and pulling the piping member from the plumbing fitting.

For example the method can be carried out in the absence of glue.

For example the method can be carried out in the absence of glue in the absence of plumbing tool.

For example the method can be carried out solely with the use of hands.

The following examples are non-limitative and are used to better exemplify the materials and processes of the present disclosure.

EXAMPLES

Referring now to FIG. 1, therein illustrated is a frontal view of an end cap 1 enclosing a receiving member (partially shown). The flanged end of the annular releasing member (release collar) 5 can be seen, along with a piping element 8 mounted on the receiving member.

According to various exemplary embodiments, the primary opening 5a may be sized according to a size of the piping layout.

Figure 2:
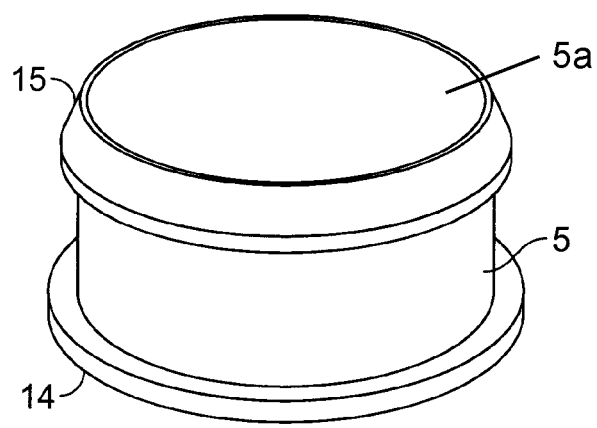
FIG. 2 illustrates a perspective view of the annular releasing member (e.g. release collar) according to one exemplary embodiment.

Referring now to FIG. 2, therein illustrated is a perspective view of the annular releasing member (release collar) 5 which forms an L-shaped portion 14 for facilitating the removal of the fitting. This L-shaped portion consists of a flanged end 14 that extends radially outwardly from the annular releasing member 5. On the side opposed to the flanged end, a beveled portion 15 can be observed. When the user pushes on the flanged end 14, this leads to the release of the steel ring teeth 6 of the annular locking member (as shown in FIG. 3) from the piping element 8 (shown in FIG. 1).

According to various exemplary embodiments, the annular releasing member 5, the flanged end 14 and the beveled portion 15 are comprised of a solid part (any type of plastic that can be used in the plumbing industry). For example, the annular releasing member, its flanged end and beveled portion are integrally molded.

Figure 3:
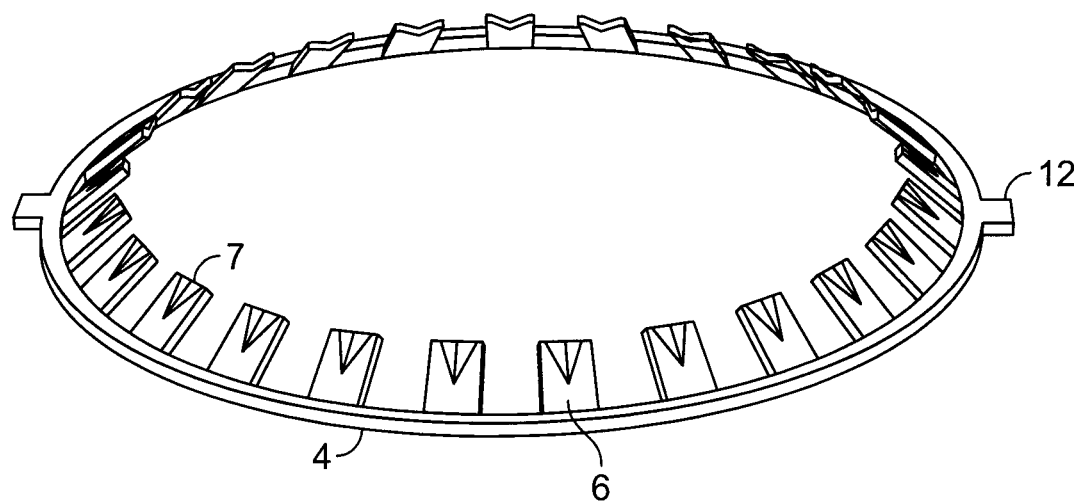
FIG. 3 illustrates a front view of the annular locking according to one exemplary embodiment.

Referring now to FIG. 3, therein illustrated is a frontal view of an annular locking member (steel ring) 4 with angled teeth 6 extending from the annular base of the annular locking member 4. When in use, the ends of at least one angled tooth 6 lock the piping element from longitudinal movement and the jagged edges 7 prevent the piping element from rotational movement (prevent the piping element from turning). In certain embodiments, as shown in FIG. 3 for example, longitudinal and rotational movement of the annular locking member 4 is further reduced with the aid of locking tabs 12 on one or more sides of the annular locking member 4. For example, there can be 2 or more locking tabs 12 around the annular locking member 4. These locking tabs are inserted in indents or locking grooves 18 formed within the receiving member.

According to various exemplary embodiments, the annular locking member 4, the teeth 6, jagged edges 7 and locking tabs 12 can be made of any hard material that is non corrosive. For example, they can be made of stainless steel.

Figure 4:
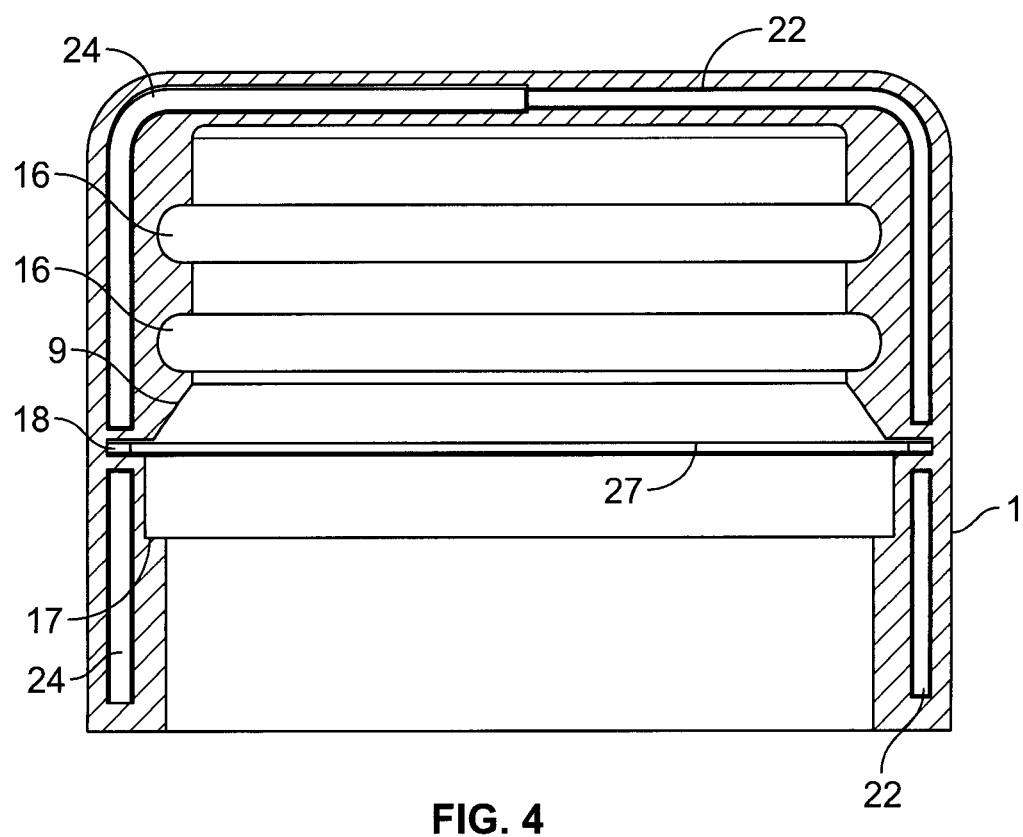
FIG. 4 illustrates a cross-sectional front view of an end cap enclosing a receiving member, according to one exemplary embodiment.

Referring now to FIG. 4, therein illustrated is a cross-sectional view of the end cap 1 enclosing a receiving member. The end cap 1 may be fabricated in different ways but are illustrated here for example as a two-cavity mold (2 half portions of the receiving member) that when combined together form the annular grooves 16 (here two grooves can be observed) as well as the locking grooves (indents) 18. Further, it can be seen in FIG. 4 that a chamber 27 is formed in the receiving member to fit the annular base of the annular locking member 4 therein. The receiving member also comprises an angular portion 9. When in use, the teeth 6 are pushed against this angular portion 9 by the beveled portion 15 of the annular releasing member (as shown in FIGS. 5 and 6).

According to various exemplary embodiments the end cap enclosing a receiving member as shown in FIG. 4, it is also shown that the bottom of the beveled portion of the annular releasing member abuts against the ledge 17. It will be understood that other elements that can be used to retain the annular releasing member in the receiving member. For example, a retaining shoulder can be used. In this example, a second chamber is formed in the receiving member. The beveled portion sits in this second chamber. In this example, one side of the beveled portion (the wider portion) abuts against the ledge projecting from the second chamber and the other side of the beveled portion (the narrower portion) abuts against the annular locking member 4.

According to various exemplary embodiments, the end cap enclosing a retaining member (as shown in FIG. 4) comprises female edges (slots) 22 and male edges (parts) 24 that can be securely coupled to one another. This overcomes the need to fuse or glue together the parts and allows joining both sides of the plumbing fitting 1. As a result, the two parts are integrally molded.

Figure 5:
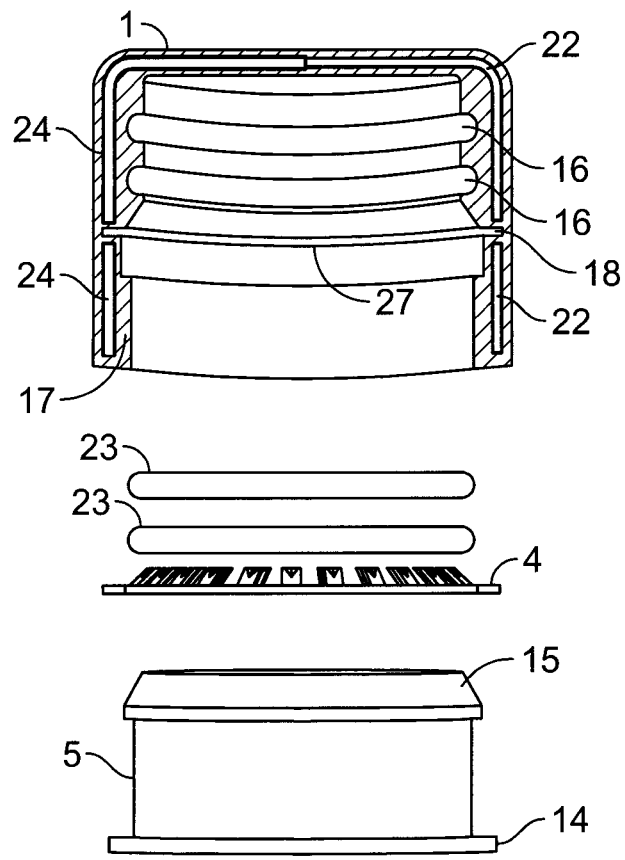
FIG. 5 illustrates a cross-sectional exploded view of the end cap enclosing a receiving member of FIG. 4.
Figure 6:
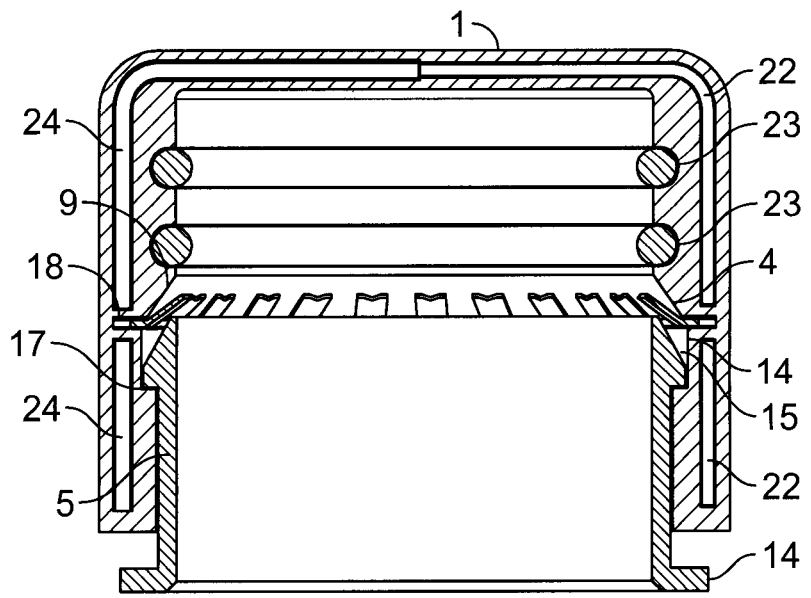
FIG. 6 illustrates a cross-sectional front view of the end cap of FIGS. 1, 2, 3, 4, and 5.

Referring now to FIGS. 5 and 6, therein illustrated are views of the end cap 1 enclosing a receiving member and more particularly showing the female indent (or edge) 22, male part (or edge) 24, the annular grooves 16, the locking grooves 18 for the locking tabs 12, the angular portion 9 of the receiving member, the first chamber 27 for receiving the annular base of the annular locking member 4 and the ledge 17 projecting from the second chamber that serves to secure the annular releasing member (release collar) 5. As shown, the annular releasing member 5 comprises a beveled portion 15 that, when is use, is pushed up by the pressing of the L-shaped flanged end 14 to release the teeth 6, 7 which are pressed towards the angular portion 9 of the receiving member.

Figure 7:
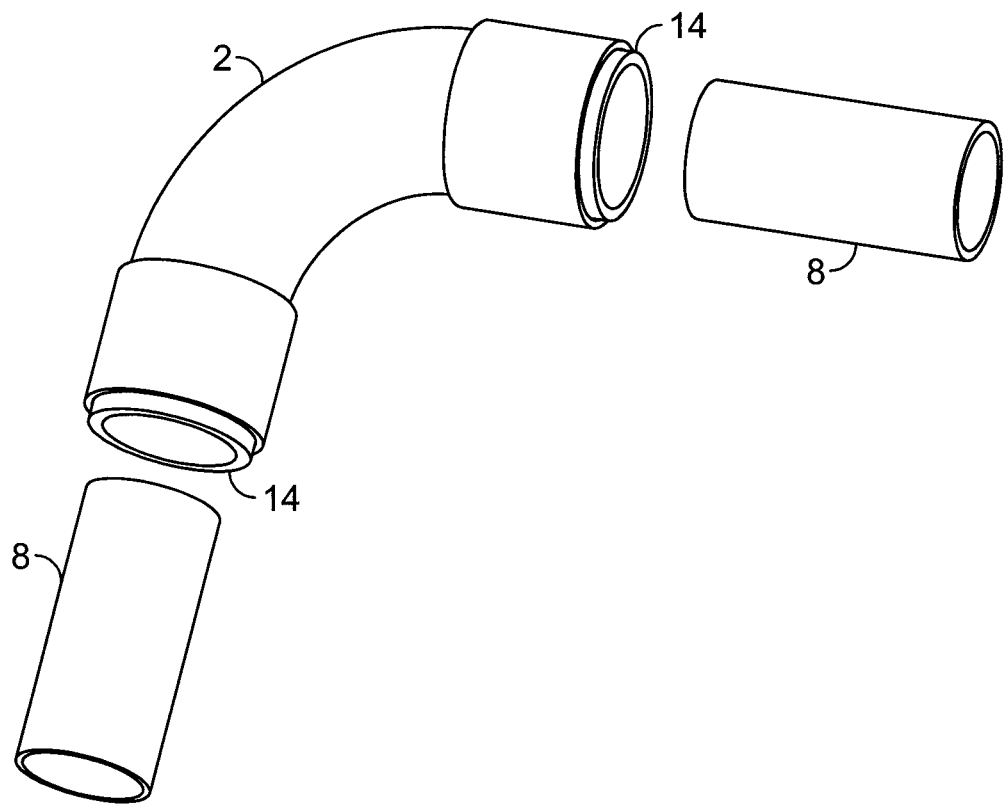
FIG. 7 illustrates a perspective view of an elbow fitting that comprises two receiving members at each extremity, in accordance with an alternative exemplary embodiment.
Figure 8:
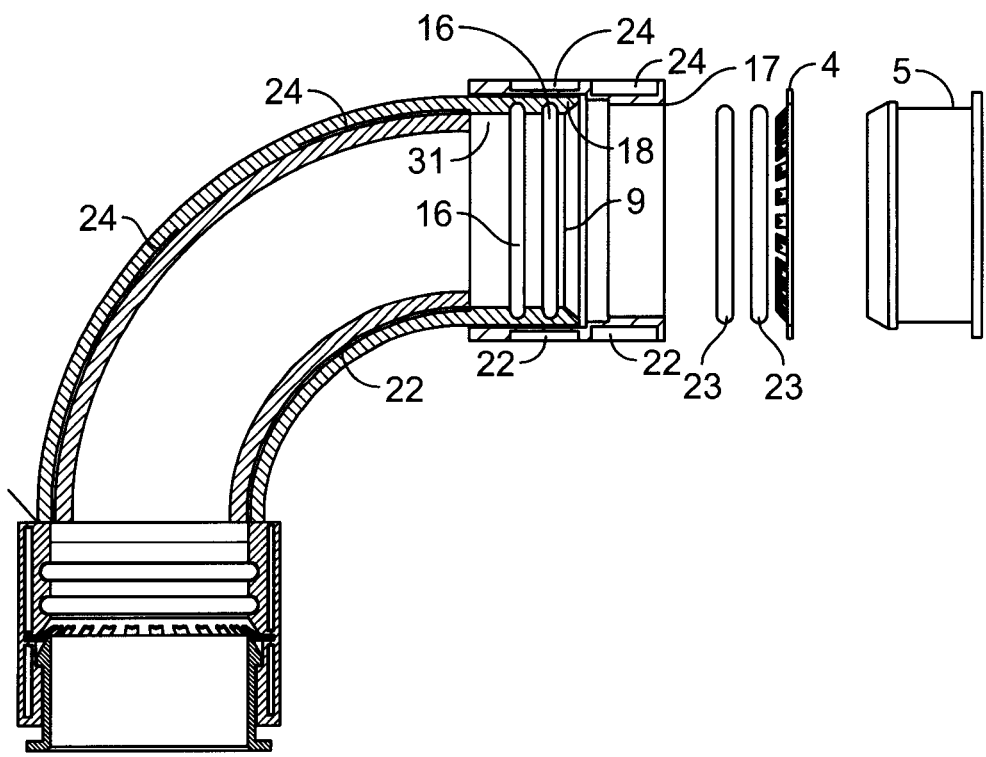
FIG. 8 illustrates a cross-sectional exploded view of the elbow fitting of FIG. 7.
Figure 9:
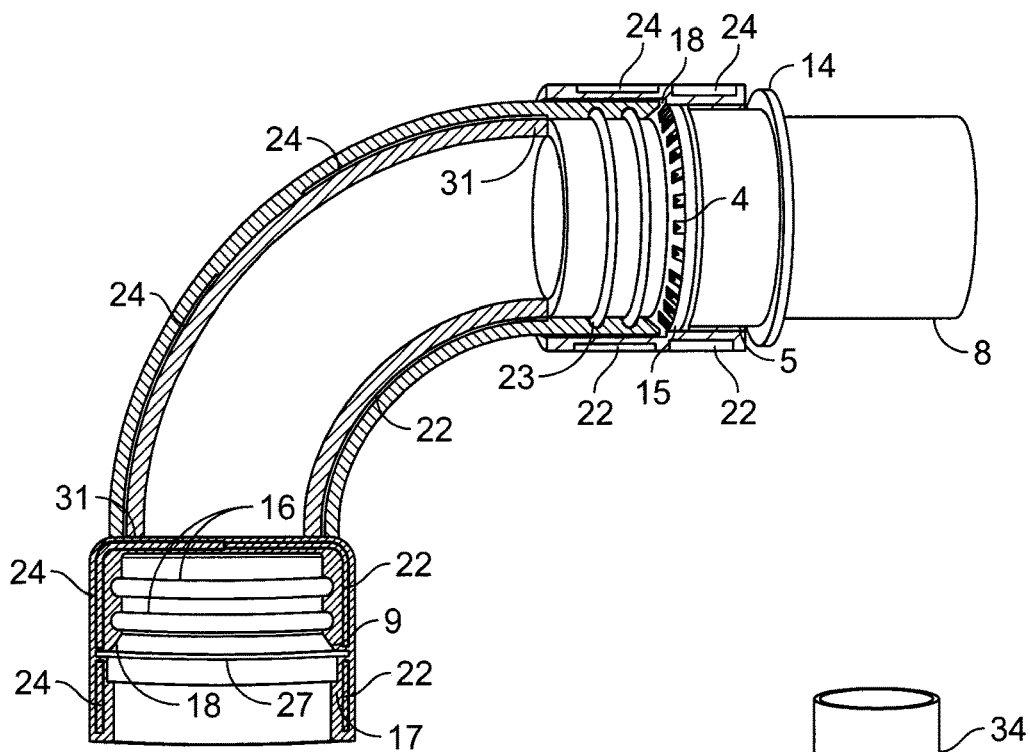
FIG. 9 illustrates a cross-section partially exploded view of the elbow fitting of FIGS. 7 and 8 mounted to a piping element.

Referring now to FIG. 7, therein illustrated is a perspective view of an elbow fitting 2. It will be understood that any other type of fitting such as (45, TY, Y, coupling, etc.) that are suitable for drains, waste or vent systems and also for central systems can be used. These fittings are also suitable for use in medical systems and medical devices as well as in HVAC systems (Heating, Ventilating/Ventilation, and Air Conditioning). Referring now to FIGS. 8 and 9, therein illustrated are exploded cross-sectional views of an elbow fitting 2 and its components. In particular, it can be seen in FIGS. 8 and 9 the female edge (indent) 22, male edge (part) 24, the annular grooves 16, the locking grooves 18, the angular portion 9 of the receiving member and the first chamber 27. Also shown is the ledge 17 that will secure the annular releasing member 5 from slipping out the receiving member. The beveled portion of the annular releasing member 15 is also shown. In use, the user pushes the flanged end 14 to release the teeth of the annular locking member 4. The teeth are pressed towards the angular portion 9 by the beveled portion which releases the piping element 8.

According to various exemplary embodiments illustrated in FIGS. 7, 8 and 9, the receiving member can be placed at either extremity of the fitting body 2. Any other type of fitting such as a 45 fitting, TY fitting, Y fitting, coupling, etc. that are used for drains, waste pipe, pool lines or vent systems and also central systems can be used. Also shown in FIGS. 8 and 9 is a shoulder 31 that will ensure an even flow without any chance of blockage in the plumbing fitting.

Figure 10:
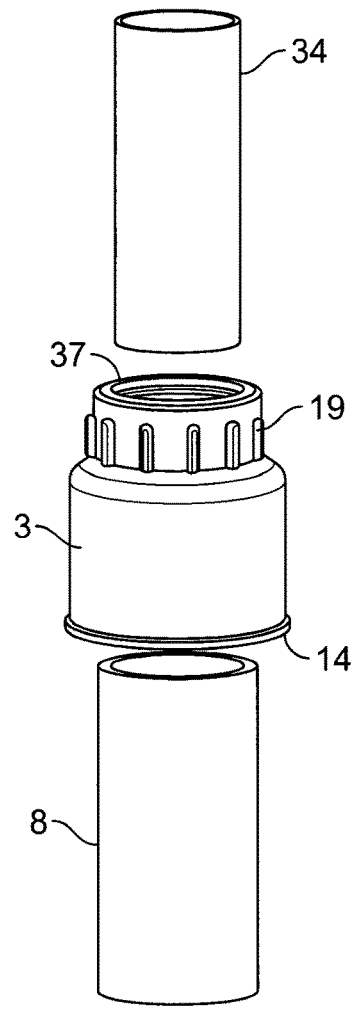
FIG. 10 illustrates an exploded view of another type of plumbing fitting, in accordance with a further exemplary embodiment.

Referring now to FIG. 10, therein illustrated is an exploded view of a trap adapter 3 comprising a tail piece 34, a piping element 8, a nut 19 and a nylon washer 37 with the annular releasing member 14.

Figure 11:
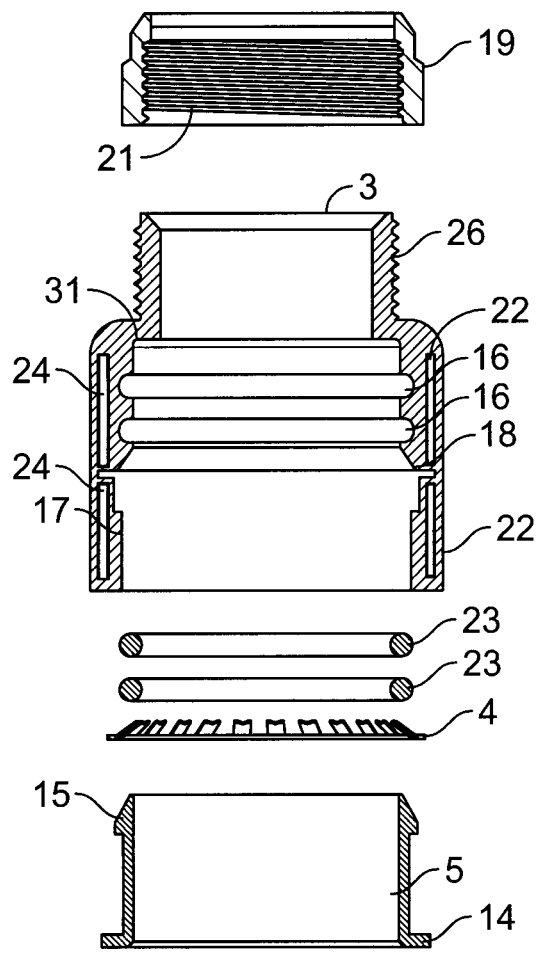
FIG. 11 illustrates a cross-sectional exploded view using the plumbing fitting of FIG. 10.
Figure 12:
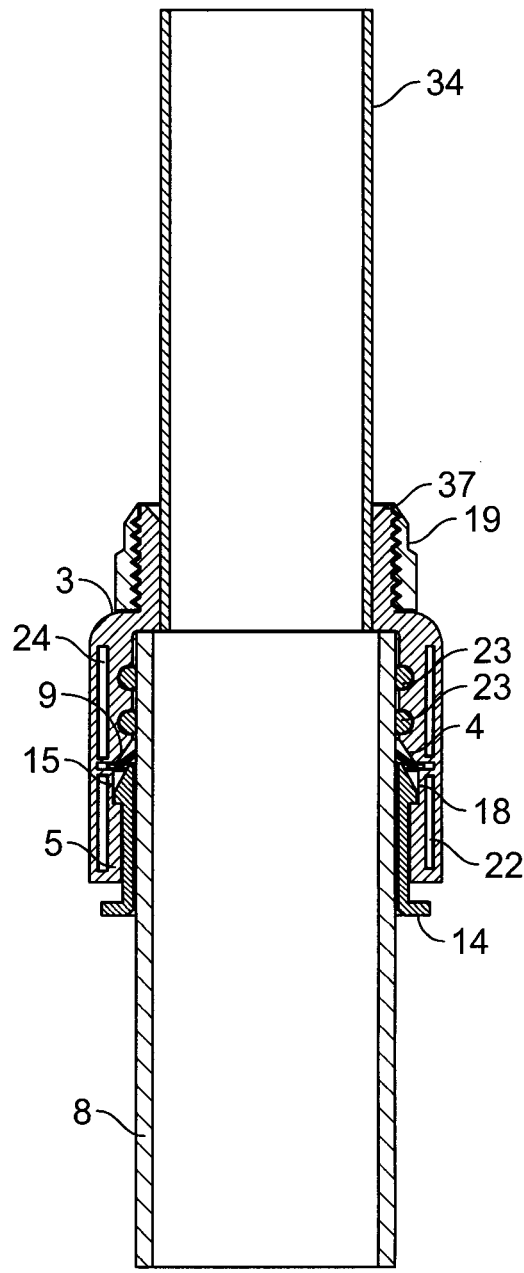
FIG. 12 illustrates a cross-sectional view of another plumbing fitting mounted to a piping element, in accordance with a further exemplary embodiment.

Referring now to FIGS. 11, 12, therein illustrated is a cross-sectional exploded view of a trap adapter 3 showing the female edge 22, male edge 24, the annular grooves 16, the locking grooves 18, the angular portion 9 of the receiving member and the chamber 27 that will receive the annular base of the annular locking member 4. Also shown is the ledge 17 for securing the annular releasing member 5. The annular releasing member 5 comprises a beveled portion 15 that when pushed up by the user by pressing the flanged end 14, releases the teeth 6, 7 thus releasing the piping element 8.

According to various exemplary embodiments, FIG. 11, 12 also show that after inserting the tail piece 34 in the trap adapter 3, a nut 19 is screwed onto the male adapter 26 and is tightened by the nylon washer 37 to prevent leakage on the tail piece 34. Also shown is a shoulder in the fitting 31 to ensure an even flow without any chance of blockage in the plumbing fitting.

Figure 13:
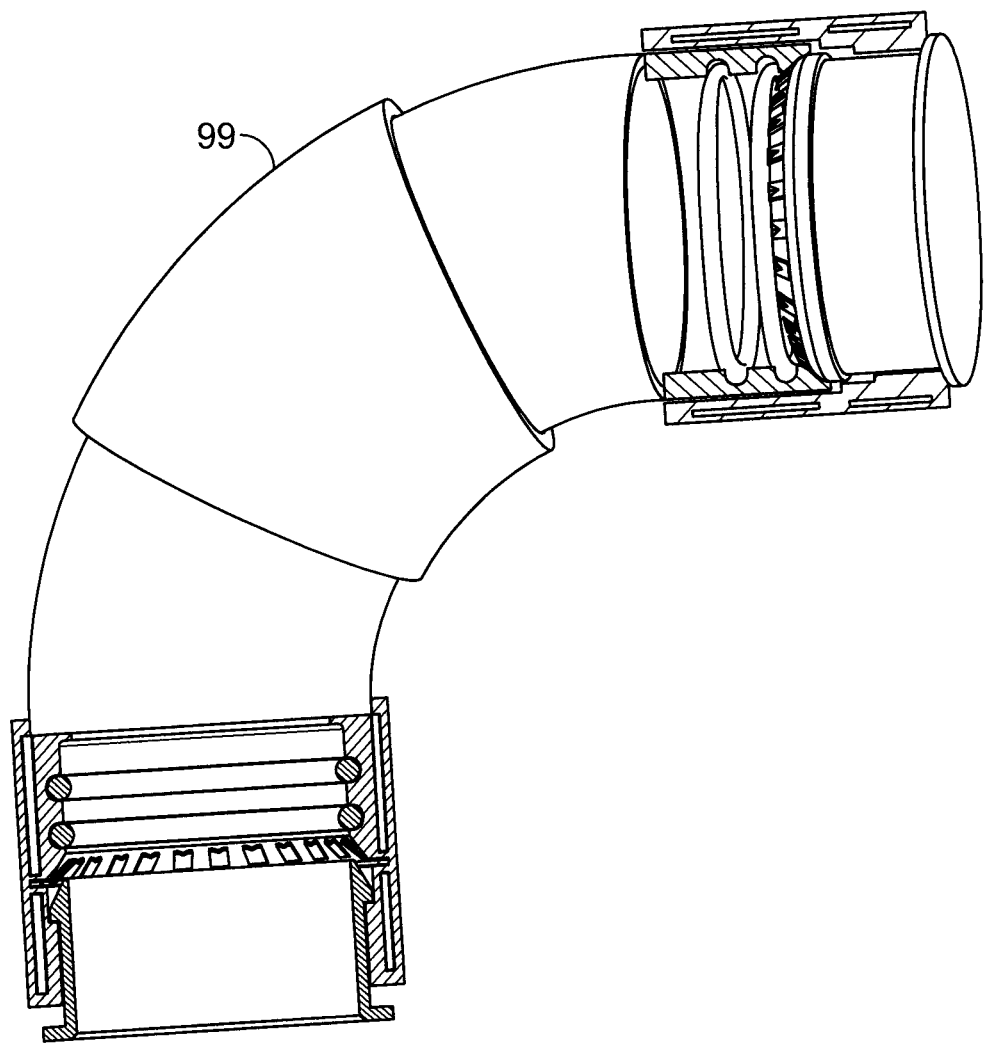
FIG. 13 illustrates a cross-sectional view of another plumbing fitting in accordance with a further exemplary embodiment.

According to another example, FIG. 13 shows a fitting having a slidable or retractable portion 99 that can be moved to select a given angle. This expandable fitting thus has this movable portion that acts as a telescopic portion that is configured to adopt a desired angle. This fitting is thus versatile and can be adjusted, for example, to adopt any angle of 0 to 90 degrees. For example, it can be a 45 or 90 degrees angle. As it can be seen from FIG. 13, the fitting is made of a male1female configuration, a male portion being slidably inserted into the female portion. Therefore, by sliding the portions (top and bottom) with respect to one another, the user can select the angle that will be adopted by the fitting.

Figure 14A:
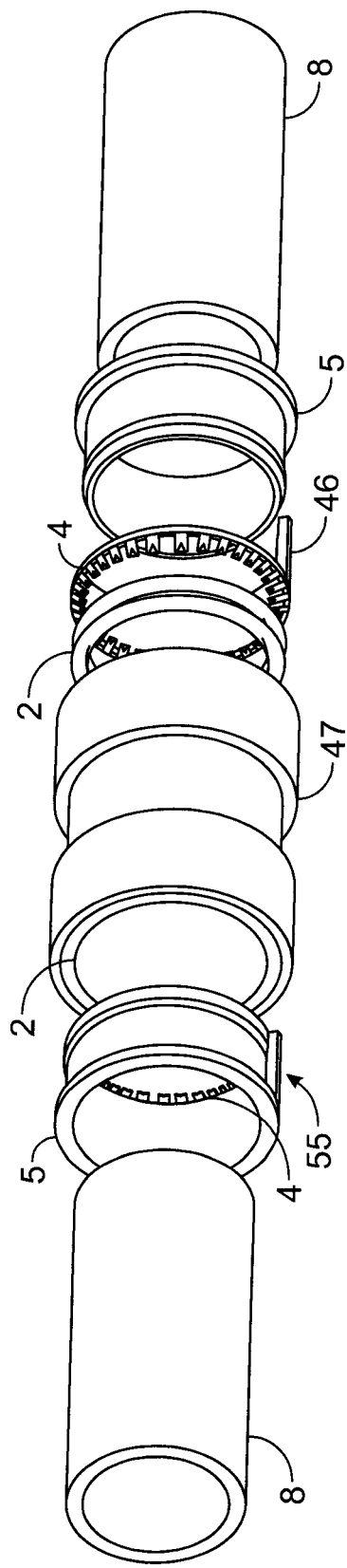
FIG. 14A illustrates an exploded view of another type of plumbing fitting, in accordance with a further exemplary embodiment.
Figure 14B:
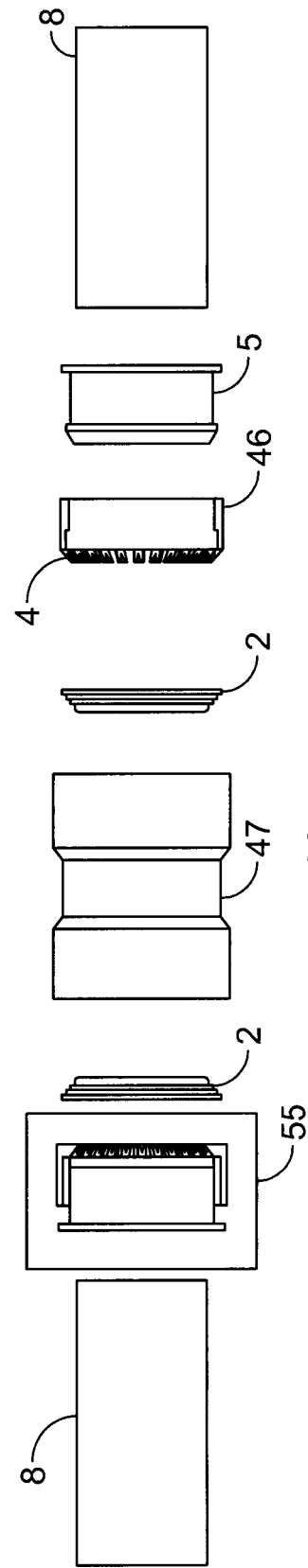
FIG. 14B is another exploded view of the plumbing fitting of FIG. 14A.

According now to FIGS. 14A, 14B and 14C, there is provided another example. The straight fitting 47 of FIGS. 14A, 14B and 14C is similar to those presented in FIGS. 7-9 but has some particularities. In fact, it has only one seal at each end. Moreover, it comprises a receiving element 46 for receiving the annular locking member 4. The annular releasing member 5 is also inserted into the receiving element 46 so as to form the combination 55. Once the seal 2 is introduced in the housing 47, the receiving element 46 having the locking member 4 and the releasing member 5 inserted therein can be inserted in the receiving member (more particularly the first chamber of the receiving member). That is eventually done at both ends of the housing 47 that has two receiving members. Then, the fitting is ready to be used and receive at both ends a piping element 8.

In FIGS. 14A, 14B and 14C, on the left side, the receiving element 46 is shown as having the locking member 4 and the releasing member 5 inserted therein (the combination 55), while on the right side, the received element 46 is show as having the locking member 4 inserted therein, but as being distant from the releasing member 5.

For example, the combination 55 can also be glued or soldered into the housing 7 in various manners.

The embodiment presented in FIGS. 14A, 14B and 14C allows for avoiding to connect together two portions or two halves of a receiving member (for example by using ultrasonic welding). Thus, simply by inserting the various members as described above, the fitting of FIGS. 14A, 14B and 14C can be manufactured. For example, the plumbing fitting of FIGS. 14A, 14B and 14C can comprise members that are all made of a single piece.

The receiving element 46 can also have at least one a seal inserted therein.

Figure 15A:
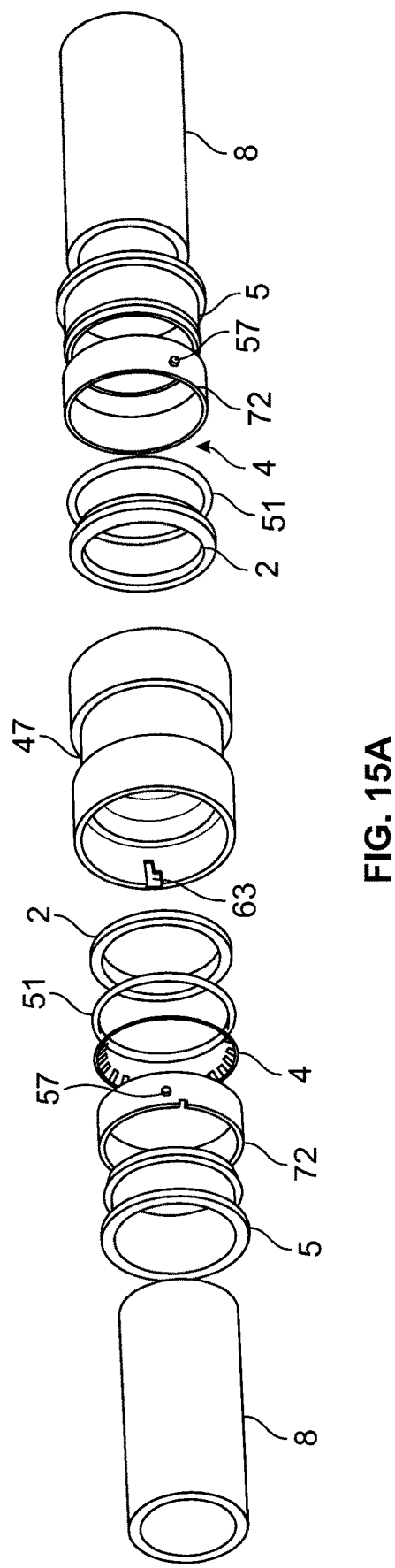
FIG. 15A illustrates an exploded view of another type of plumbing fitting, in accordance with a further exemplary embodiment.
Figure 15B:
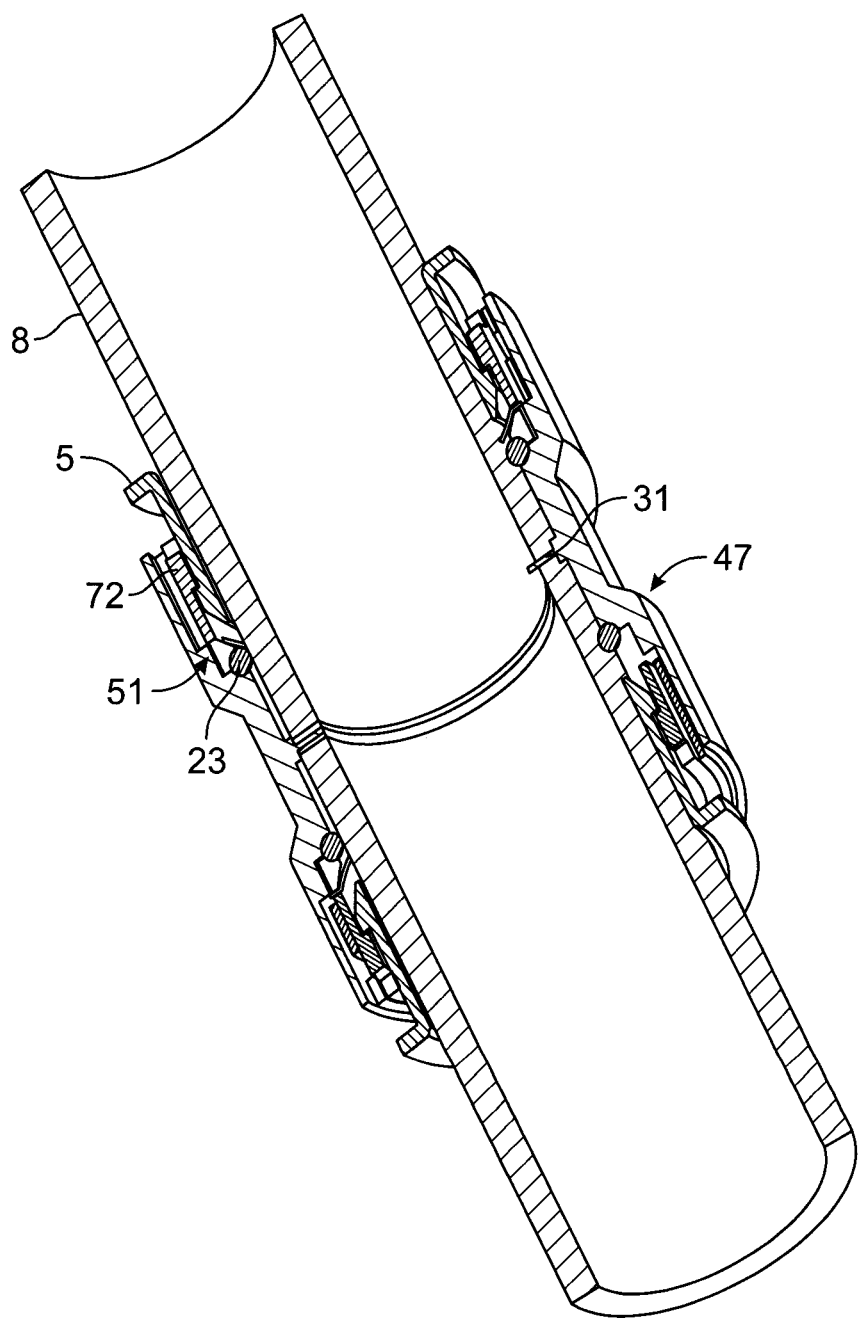
FIG. 15B is a cross section view of the plumbing fitting of FIG. 15A.
Figure 16:
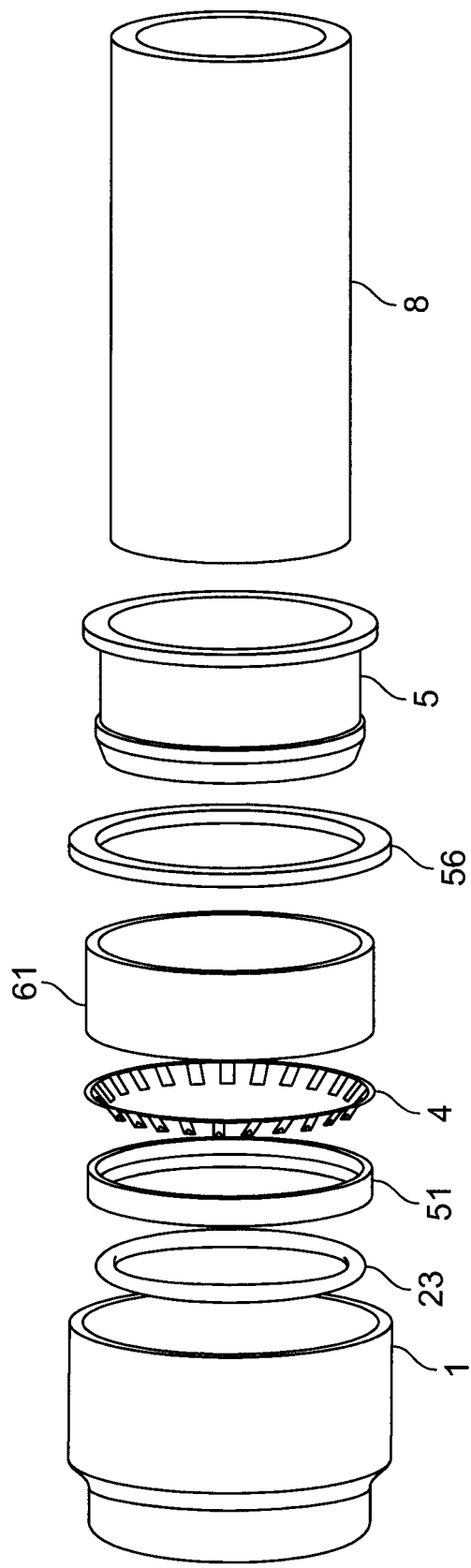
FIG. 16 illustrates an exploded view of another type of plumbing fitting, in accordance with a further exemplary embodiment.

In the plumbing fitting of FIGS. 15A and 15B, the seal 2 in introduced into the coupling or fitting 47. Then, the spacer 51 is inserted into the coupling or fitting 47. Such a spacer is used to maintain or urge the teeth of the locking member 4 inwardly. This allows for maintaining the plumbing fitting efficient even after several uses. The locking member 4 is then inserted into 47 and the receiving element 72 (squeeze cup) squeezes the locking member 4, the spacer 51 and the seal 2 into the fitting or coupling 47. The receiving element 72 also comprises at least one nipple 57 that is effective for locking it into the matching groove or recess 63 formed into the fitting or coupling 47. The recess or grove 63 could alternatively be a slot that is defined in the entire thickness of the fitting 47. The spacer 51 can be made of any type of hard plastic or rubber so that the teeth of the locking member 4 can have a spring back reaction. The receiving element 72 squeezes 4, 51 and 2 to it place in 47 having 57 following the slot and then at the end a small twist will lock the receiving element 72 as well as 4, 51 and 2 into place.

Alternatively, the receiving element 72 can be glued into 47, and in such a case does not require the nipple 57 and matching groove or recess 63. The releasing member 5 is pushed or snapped into 72 at the end. The seal 2 can be any type of seal that is used to code.

FIG. 15B is a cross section of FIG. 15A with the exception of the seal 23 that replaces the seal 2 of FIG. 15A.

It can be seen from FIG. 15B that the plumbing fitting still have 31 that serves as a shoulder or pipe stopper to create an even flow.

The seal 23 can be of any shape, form or any material needed to create a seal with the pipe.

The fitting 1 is at one end 23 being a o-ring (or any other type of seal)

The spacer 51 between the seal 23 and 4 having a bevel in it for the locking member 4 to set on and can be made of any type of hard plastic or rubber so that the teeth can have a spring back reaction, The receiving element 61 being a squeeze cup that squeezes locking member 4, spacer 51 and seal 23 into its place in fitting 1.

The element 56 being the lock ring that is glued on fitting 1 at the end to hold 61 in place.

The releasing member 5 being the release collar that is snapped into 61.

The element 56 may not be needed if found that gluing or a snapping system of 61 is a better option.

Figure 17:
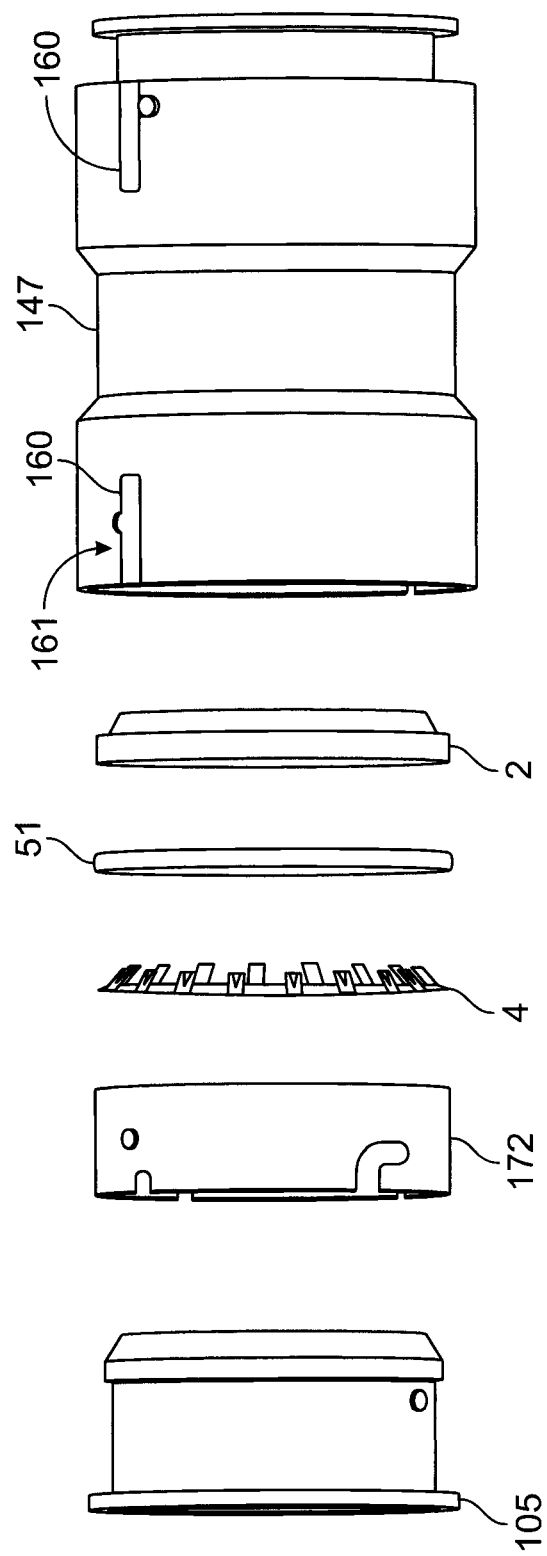
FIG. 17 illustrates an exploded view (right side) and an assembled view (left side) of another type of plumbing fitting, in accordance with a further exemplary embodiment.
Figure 18:
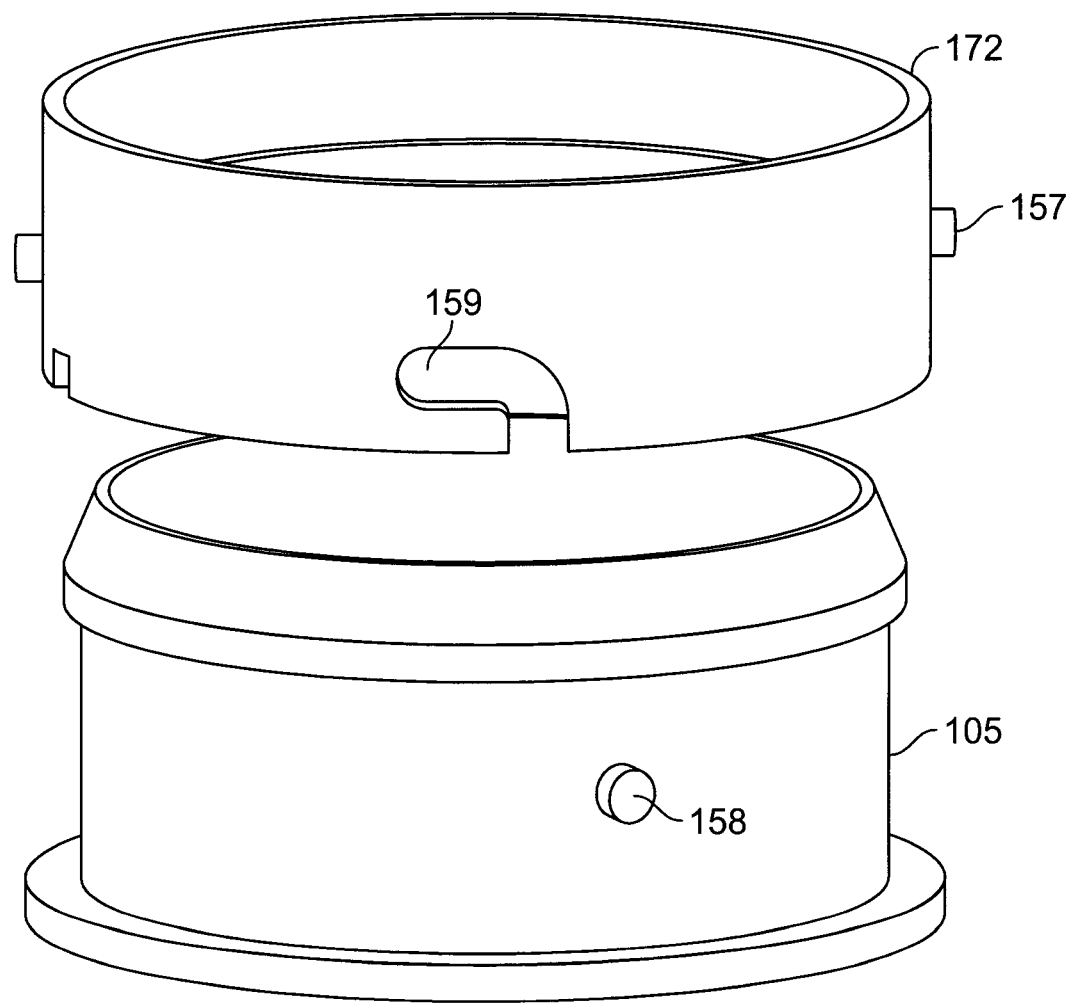
FIG. 18 illustrates an exploded view of two elements for the example of FIG. 17.

In FIGS. 17 and 18, there is shown a different version the releasing member 105 comprising a nipple 158 dimensioned to enter into slot 159 of the receiving element 172. The receiving element 172 comprises a nipple 157 adapted to be inserted into a slot shown at the bottom left part of fitting 147. The locking member 4, the spacer 51 and the seal 2 are as discussed regarding FIG. 15A. As shown in FIG. 17 (see left side), when all constituents 105, 172, 4, 51 and 2 are snap fitted into fitting 147, the nipple 159 is inserted into slot 161. In order to release a piping member that would be inserted in all constituents 105, 172, 4, 51, 2 and 147, a user can simply turn releasing member (see releasing member at left part of FIG. 17) upwardly to more back nipple 159 into slot 160 (rather than slot 161) and then push the releasing member 105 toward fitting 147 to urges the teeth of the annular locking member 5 outwardly and disengage the piping by pulling it outside of all constituents 105, 172, 4, 51, 2 and 147. To insert back a piping into fitting 147, the user simply need to insert back the piping into 105, 172, 4, 51, 2 and 147 and then rotate downward member 105 so as to put back nipple into slot 161 (rather than slot 160), thereby locking the piping member into fitting 147.

It will be understood that any other type of fitting such as (45, TY, Y, coupling, etc.) can be used rather than the straight fitting shown in FIGS. 14A, 14B 14C, 15A, 15B, 16, 17 and 18. Such a fitting can be ABS or PVC or any other type of DWV, HVAC or medical pipe being used for that purpose. It can be suitable for drains, waste or vent systems and also for central systems can be used. The fitting can be suitable for use in medical systems and medical devices as well as in HVAC systems (Heating, Ventilating/Ventilation, and Air Conditioning).

It was found that the fitting, methods and kits of the present disclosure are very useful since can avoid using ABS glue or PVC glue or primers that can be required before applying a glue. Moreover, they can be assembled without the use of plumbing tools. That can also be used without requiring a precise straight alignment (like conventional plumbing fittings). In conventional plumbing fitting, if the alignment is not almost perfectly straight, this may result in water leaking. Also, the fitting, allow for a rotation of the piping into the fitting. Glued conventional piping members and fittings cannot rotate with respect to one another. Also a user can easily disassemble a piping from a fitting by pressing the release member and rapidly reintroduce it. That cannot be done with a conventional glued piping and fitting combination. A lot of wasted time and material can be saved by using the fittings, kits and methods of the present disclosure.

The scope of the claims should not be limited by specific embodiments and examples provided in the disclosure, but should be given the broadest interpretation consistent with the disclosure as a whole.

What is claimed is:

1. A plumbing fitting, comprising:
   a housing having at least one receiving member, said at least one receiving member defining a cylindrical bore for receiving a piping member therein;
   at least one annular seal fittingly inserted in an annular groove formed in said receiving member, said at least one annular seal dimensioned to sealingly engage with said piping member;
   an annular locking member comprising an annular base and teeth extending inwardly for locking said piping member within said receiving member, said annular base being dimensioned for contacting a receiving element inserted in said receiving member, said annular locking member dimensioned for receiving said piping member therethrough; and
   an annular releasing member inserted within said receiving element and said receiving member and comprising a beveled portion, said annular releasing member being dimensioned to receive said piping member therethrough, and said annular releasing member being movable within said receiving element between a locking position for locking said pipe into said receiving member whereat said beveled portion abuts against a shoulder formed in an inner surface of said receiving element, and a releasing position whereat said beveled portion presses against said teeth of said annular locking member for releasing said piping member;
   wherein said receiving element maintains said annular locking member and said at least one annular seal inside said receiving member;
   wherein said receiving element is snap fitted into said receiving member; and
   wherein said receiving element comprises at least one nipple effective for locking into a matching groove defined into said receiving member.

2. The plumbing fitting of claim 1, further comprising a spacer disposed between said annular locking member and said annular seal, said spacer being urging the teeth of the locking member inwardly.

3. The plumbing fitting of claim 1, wherein said plumbing fitting comprises two annular seals.

4. The plumbing fitting of claim 1, wherein said teeth are dimensioned for preventing rotational movement and longitudinal movement of said piping member within said receiving member.

5. The plumbing fitting of claim 1, wherein said annular base of said annular locking member comprises at least one locking tab extending outwardly therefrom for reducing rotational and longitudinal movement of said annular locking member within said receiving member, said at least one locking tab is inserted in a locking groove formed in said receiving member.

6. The plumbing fitting of claim 5, wherein said annular base of said annular locking member comprises two locking tabs inserted in two locking grooves formed in said at receiving member.

7. The plumbing fitting of claim 1, wherein said teeth comprise jagged edges.

8. The plumbing fitting of claim 1, wherein said beveled portion rests in a second chamber formed in said receiving member.

9. The plumbing fitting of claim 8, wherein a ledge projecting from said second chamber forms said shoulder against which said beveled portion abuts.

10. The plumbing fitting of claim 1, wherein when said annular releasing member is in said releasing position, said beveled portion presses against said teeth which are displaced towards the inner surface of said receiving member thereby releasing said teeth from said piping element.

11. The plumbing fitting of claim 1, wherein said annular releasing member further comprises a flanged end opposing said beveled portion.

12. The plumbing fitting of claim 11, wherein pressing of said flanged end presses said beveled portion against said teeth thereby releasing said teeth from said piping member.

13. The plumbing fitting of claim 1, wherein said annular releasing member is actuatable in the absence of a tool.

14. The plumbing fitting of claim 1, wherein said plumbing fitting is an end cap, a coupling fitting, a Y fitting, a T fitting, a TY fitting, an 45 elbow fitting or a 90 elbow fitting.

15. The plumbing fitting of claim 1, further comprising a spacer for preventing said teeth of said locking member from moving outwardly beyond a desired position.

16. A plumbing fitting, comprising:
   a housing having at least one receiving member, said at least one receiving member defining a cylindrical bore for receiving a piping member therein;
   at least one annular seal fittingly inserted in an annular groove formed in said receiving member, said at least one annular seal dimensioned to sealingly engage with said piping member;
   an annular locking member comprising an annular base and teeth extending inwardly for locking said piping member within said receiving member, said annular base being inserted within a first chamber formed in said receiving member, said annular base being dimensioned for contacting a receiving element inserted in said receiving member, said annular locking member dimensioned for receiving said piping member therethrough; and
   an annular releasing member inserted within said receiving member and comprising a beveled portion, said annular releasing member being dimensioned to receive said piping member therethrough, and said annular releasing member being movable within said receiving member between a locking position whereat said beveled portion abuts against a shoulder formed in an inner surface of said receiving member, and a releasing position whereat said beveled portion presses against said teeth for releasing said piping member;

wherein said receiving element maintains said annular locking member and said at least one annular seal inside said receiving member;

wherein said receiving element is snap fitted into said receiving member; and wherein said receiving element comprises at least one nipple effective for locking into a matching groove defined into said receiving member.

* * * * *